(No Model.)
J. MORGAN.
ORCHARD AND VINEYARD CULTIVATOR.
No. 390,305. Patented Oct. 2, 1888.
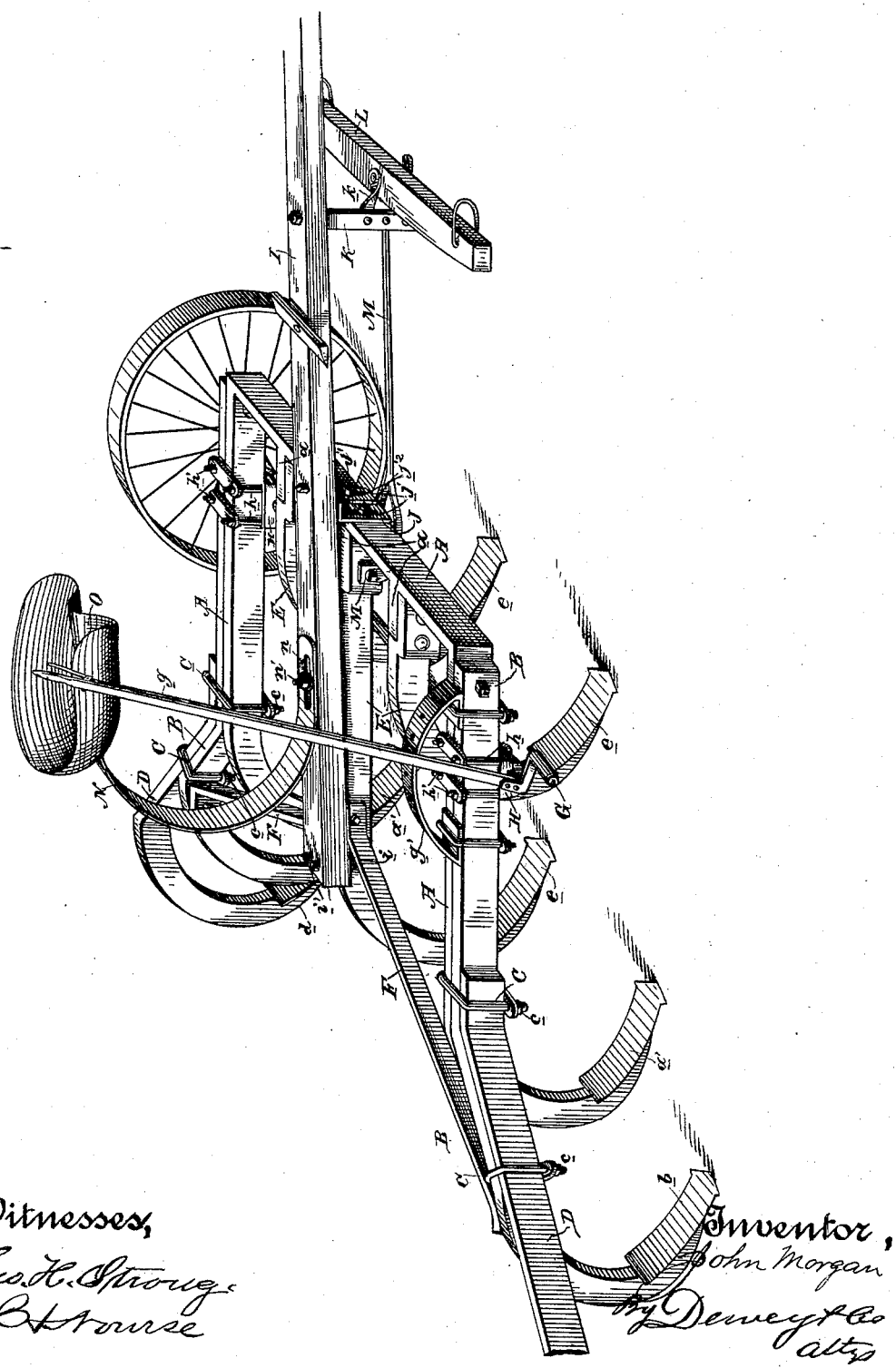

UNITED STATES PATENT OFFICE.

JOHN MORGAN, OF SANTA CLARA, CALIFORNIA.

ORCHARD AND VINEYARD CULTIVATOR.

SPECIFICATION forming part of Letters Patent No. 390,305, dated October 2, 1888.

Application filed May 16, 1888. Serial No. 274,073. (No model.)

*To all whom it may concern:*

Be it known that I, JOHN MORGAN, of the city and county of Santa Clara, State of California, have invented an Improvement in Orchard and Vineyard Cultivators; and I hereby declare the following to be a full, clear, and exact description of the same.

My invention relates to that class of cultivators which are especially adapted for use in orchards and vineyards; and my invention consists in the novel construction of the main frame and the novel attachment to the sides thereof of supplementary teeth, in the connection and adjustment of the pole or tongue, the peculiar connection of the whiffletree and draft mechanism to the main frame, and in general details of construction and arrangement, all of which I shall hereinafter more fully describe.

The object of my invention is to provide a simple and effective cultivator of this class.

Referring to the accompanying drawing for a more complete explanation of my invention, the figure is a perspective view of my cultivator.

The main frame A of the machine consists of a single bent bar forming three sides of a rectangular figure, the front bar being provided with three backwardly-projecting lugs, $a$. To the sides of the frame, the ends of which carry teeth $a'$, are secured the outwardly-bent arms B, the ends of which carry teeth $b$. The connection between these arms and sides is made by means of ordinary clips or staples, C, which embrace both arms and sides and receive yokes and nuts $c$ on their lower ends.

To the outwardly-bent arms B are secured still other arms, D, which carry teeth $d$, the connection being made, as before, by means of clips or staples, yokes, and nuts.

To the backwardly-projecting lugs $a$ of the front bar of the frame are secured arms E, which carry teeth $e$, the center one of said arms being extended rearwardly to a point about in line with the ends of the sides of the main frame, and it has secured to it two diagonal bars, F, which extend to the arms B, as shown, and serve to steady and brace the entire machine.

G is the crank-axle of the machine, having connected with it the operating-lever $g$ in the usual manner, said lever engaging a rack, $g'$.

The box H, in which the axle is carried, is made fast to the sides of the frame and to the arms B by means of clips or staples $h$, which receive yokes and nuts $h'$, this connection being made for the purpose of permitting its ready disengagement or loosening, so that the box may be moved either forward or back and carry the axle with it in order to properly balance the machine.

The object in connecting the tooth-carrying arms B and D by means of the clips or staples is to render them readily attachable and detachable, and also easily adjustable when in place. This is especially true of the outermost arms, D, which are frequently removed in order to decrease the width of the machine for the particular work being then done and replaced to increase the width again when desired. This arrangement of the frame provides for the proper location of the several teeth, so that all the ground will be properly passed over.

I is the tongue or pole of the machine, its rear end being connected by a clip or staple, $i$, with the center arm, E, said clip or staple being secured by nuts $i'$. Underneath the pole, just in front of the frame, is bolted fast an angular connecting-plate, J, the legs of which are slotted at $j$ and fit over pins or bolts $j'$, secured in the front bar of the main frame, which said pins or bolts have nuts $j^2$ to set the plate J in place.

Now by loosening the nuts $i'$ of the clip $i$ at the rear of the pole, and by loosening the nuts $j^2$ on the guide pins or bolts $j'$, which pass through the slots in the connecting-plate J, the tongue may be raised or lowered to suit different sizes of horses, and when adjusted it may be fixed in place by tightening up the nuts; but in order to keep the draft low, and thus provide for the proper pull of the machine to keep its teeth in the ground, I have the following arrangement:

K is a standard extending down from the pole or tongue, and having attached to it by a suitable clevis, $k$, the whiffletree L. A rod, M, is secured to this standard and extends rearwardly, being forked at its rear end and passing under the front bar of the frame and curved up behind it, being there bolted to the backwardly-projecting lug $a$ of said bar on one side and to the arm E on the other side. This puts the draft at the proper height.

Upon the rear of the tongue is secured the seat-spring N of the seat O. This spring has a slotted base at $n$, so that it may be adjusted forward or back over the securing pin or bolt $n'$, which extends into the tongue.

Having thus described my invention, what I claim as new, and desire to secure by Letters Patent, is—

1. In a cultivator, and in combination with the main frame, supplementary teeth having outwardly-bent arms fitted to the sides of the main frame, and the clips or staples with nuts and yokes for securing the arms to the sides of the frame, whereby they may be readily attached to and detached from the frame and adjusted in or out to vary the width of the machine, substantially as herein described.

2. In a cultivator, the main frame, in combination with the outwardly-bent tooth-carrying arms B, the outwardly-bent tooth-carrying arms D, and the staples or clips and nuts and yokes securing the sides and arms together, whereby said arms may be readily applied to and detached from the main frame, and may be adjustable in or out to increase or decrease the width of the machine, substantially as herein described.

3. In a cultivator, the three-sided main frame having teeth on its sides and backwardly-extending lugs from its front bar, in combination with arms carrying teeth, secured to said lugs, and outwardly-bent arms carrying teeth, said arms being adjustably secured to the sides of the frame, whereby the width of the machine may be varied, substantially as herein described.

4. In a cultivator, the main toothed frame having the arms E and lugs $a$, and the pole or tongue secured to said frame, in combination with a depending standard secured to the pole, the whiffletree secured to the standard, and the link connecting the standard with the main frame, said link having a forked rear end, the members of which are secured to the lug $a$ and bar E, respectively, as herein described.

In witness whereof I have hereunto set my hand.

JOHN MORGAN.

Witnesses:
GEORGE CENTER,
WILLIAM MILLER.